United States Patent [19]
Blanyer

[11] 3,810,251
[45] May 7, 1974

[54] PRECISION CONSTANT SPEED CONTROL FOR VARIABLE SPEED PRIME MOVER

[75] Inventor: Carl G. Blanyer, Thousand Oaks, Calif.

[73] Assignee: Abex Corporation, New York, N.Y.

[22] Filed: Jan. 3, 1972

[21] Appl. No.: 215,063

[52] U.S. Cl. .............................. 290/40, 290/40.2
[51] Int. Cl. .............................. H02p 9/04
[58] Field of Search .................. 290/40, 1; 317/5

[56] References Cited
UNITED STATES PATENTS

| | | | |
|---|---|---|---|
| 3,513,324 | 5/1970 | Domann et al. | 290/40 |
| 2,866,150 | 12/1958 | Lewis | 290/40 |
| 3,305,723 | 2/1967 | Maine et al. | 290/40 |
| 3,575,603 | 4/1971 | Schlicher | 290/40 |
| 3,234,396 | 2/1966 | Kubilos | 290/40 |
| 3,122,678 | 2/1964 | Marlot | 290/40 X |
| 2,955,210 | 10/1960 | Dean et al. | 290/40 |
| 2,772,378 | 11/1956 | Farkas | 290/40 X |
| 2,768,331 | 10/1956 | Cetrone | 290/40 X |

Primary Examiner—G. R. Simmons
Attorney, Agent, or Firm—James B. Kinzer

[57] ABSTRACT

A precision constant-speed control for a motor or other prime mover driving an output shaft and equipped with a speed control device, such as a servo valve, responsive to an applied D.C. control signal. The precision control includes a prime signal generator developing a prime electrical signal having a frequency that varies with changes in the shaft speed; the prime signal is applied to a solid-state synchronous gating detector, having a filter connected to its output, to develop a D.C. control signal which varies in amplitude as a linear function of the frequency of the prime signal. This control signal is applied to the speed control device to maintain the prime mover speed constant within about one percent.

7 Claims, 7 Drawing Figures

PRECISION CONSTANT SPEED CONTROL FOR VARIABLE SPEED PRIME MOVER

BACKGROUND OF THE INVENTION

There are many applications for an effective electrical control system that generates corrective D.C. control signals in response to the deviation of the frequency of an A.C. input signal from a set point, particularly where the frequency of the input signal is an accurate analog of the rotation speed of the shaft. The range of applications is especially broad if the control system requires no additional source of power, is settable and accurate over a wide range of temperatures, and is constructed from readily available components. A prime application for a control system of this kind is in the electrical power system of an airplane, generating A.C. power for use in various instruments and other equipment. The available power source is the engines of the aircraft, which vary in speed over a wide range between takeoff and touchdown. In a typical system, the generator for the electrical system of the aircraft is driven by a variable speed prime mover that is in turn driven from the aircraft engines through either a mechanical, hydraulic, or pneumatic linkage. The frequency of the A.C. supply for the aircraft must be maintained constant, within about one percent or less, to afford consistent operation of the instruments and other equipment.

There are numerous other applications for control systems of the type described generally above. For example, in paper mills and steel mills, multiple shafts must be rotated in essentially exact synchronism so that relative speed errors are effectively nullified, at least on a time-average basis. Similar requirements are presented in other industrial applications, and equally stringent speed requirements are imposed in conjunction with auxiliary power supplies for laboratories and other installations in which the frequency of an electrical signal or the speed of a rotating shaft must be closely controlled.

In many of these applications, it may be useful or desirable to utilize the rotating shaft that is controlled as the basic source of power for the control system. In an aircraft electrical installation, for example, elimination of any requirement for a separate power supply is a substantial advantage. Accordingly, in many instances it is particularly desirable for the precision speed control to have a relatively low power consumption so that it can operate on the basis of a power supply that is itself energized by a limited output from a signal generator that supplies basic speed information to the control system.

SUMMARY OF THE INVENTION

It is a principal object of the present invention, therefore, to provide a new and improved precision constant-speed control for a power system of the kind including a variable speed prime mover and a speed control for the prime mover, that affords improved accuracy in overall speed control by means of an electronic control circuit of limited complexity and relatively low cost.

Another object of the invention is to provide a new and improved precision electronic constant-speed control for a variable speed prime mover in which the only components that directly determine the operating speed of the prime mover are precision resistors and capacitors in a simple phase shift network that permits the sharpness of the peaking of the network response to be selected conveniently over a broad range to optimize the choice between sensitivity and bandwidth or dynamic response to speed fluctuations.

A further object of the invention is to provide a new and improved precision constant-speed control for a variable speed prime mover in which the overall response of the control is essentially symmetrical about a selected operating frequency, so that the response is similar for both increases and decreases in frequency.

An additional object of the invention is to provide a new and improved precision constant-speed control for a variable speed prime mover in which calibrations, adjustments, and internal references are held to a minimum and in which variation or drift in the operating points of various active elements contribute primarily only to common-mode variations in operation, thereby avoiding undesirable secondary effects on the operating speed of the prime mover.

A particular object of the invention is to provide a new and improved precision constant-speed control for a variable speed prime mover in which the power consumption of the complete control is low and power supply voltage requirements are quite limited so that the control can derive both functional information and operating power from an input signal of limited amplitude.

An additional object of the invention is to provide new and improved precision constant speed control for a variable speed prime mover in which the effect of noise and harmonics in an input signal representative of the prime mover speed are effectively and inherently minimized in operation of the control.

Accordingly, the invention is directed to a precision constant-speed control for a power system of the kind including a variable-speed prime mover driving an output shaft and a speed control device, coupled to and controlling the speed of the prime mover, responsive to an applied D.C. control signal. A constant-speed control constructed in accordance with the invention comprises a prime signal generator, driven by the prime mover output shaft, for developing a prime electrical signal having a frequency representative of the shaft speed, and a synchronous detector including a solid-state electronic switch having a main input, a gate input, and an output. Gate signal generator means, coupled to the prime signal generator, are utilized to generate a gating signal of substantially rectangular waveform at the frequency of the prime signal and to apply the gating signal to the gate input of the electronic switch to actuate the switch on and off in alternate half cycles of the gating signal. A coupling network applies the prime signal to the main input of the electronic switch; the coupling network includes a phase shift circuit for shifting the phase of the input to the electronic switch by an odd multiple of 90° at a given operating frequency, the amount of phase shift varying approximately montonically with frequency. Filter means are coupled to the output of the electronic switch, for developing a D.C. control signal varying in amplitude as a function of frequency of the main input to the electronic switch. Means are provided for applying the control signal from the filter means to the speed control device to maintain the speed of the prime mover constant.

DESCRIPTION OF THE PREFERRED EMBODIMENTS

Figure 1:
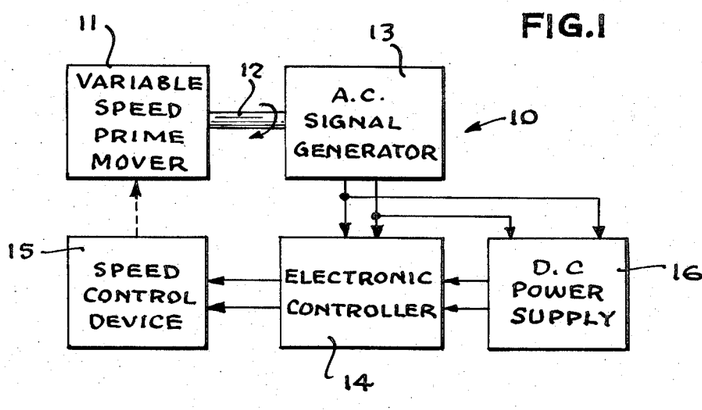
FIG. 1 is a block diagram illustrating the application of the invention to a variable speed prime mover.

FIG. 1 is a block diagram of a power system 10 of the kind in which a speed control constructed in accordance with the present invention may be employed. Power system 10 includes a variable speed prime mover 11, which may comprise a hydraulic motor having a mechanical overspeed cutout valve and equipped with an electro-hydraulic servo valve for speed control. The speed control servo valve is shown separately in FIG. 1 as a speed control device 15. A hydraulic motor of this kind has continuously variable displacement determined by the servo valve. The use of a variable displacement motor of this kind reduces heat rejection and system flow demand throughout a substantial torque range while the motor is operated at a constant speed and affords an advantageous prime mover suitable for use in aircraft electrical systems and other applications demanding high precision and extending reliability.

Prime mover 11 can also be of a type quite different from the variable displacement hydraulic motor discussed above. For example, prime mover 11 may constitute a variable speed electric motor, driven from a conventional power supply, in which case the speed control device 15 may comprise an electrical control connected to the field windings of the motor. Prime mover 11 may also comprise a variable transmission connected to a mechanical drive of one form or another and equipped with a speed control device 15 that is responsive to an electrical signal to adjust the transmission ratio. In all instances, the prime mover is employed to drive an output shaft 12 and is equipped with a speed control device 15, responsive to an applied electrical signal, to maintain the shaft speed constant.

The output shaft 12 of prime mover 11 drives an A.C. signal generator 13. In some applications, generator 13 may comprise a conventional rotating generator capable of producing substantial power, as in the electrical system of an aircraft, in a stationary A.C. power system, and in other like applications. On the other hand, if shaft 12 is used to drive a mechanical load, rather than an electrical load, generator 13 may be a small auxiliary generator employed only for control purposes. Indeed, generator 13 may comprise a simple magnet and coil pickup device actuated by shaft 12, of the kind utilized in conjunction with tachometers and other speed-measuring devices. Virtually any simple transducer that produces an output signal having a frequency representative of the rotational speed of shaft 12 can be employed as generator 13.

The output of generator 13, referred to herein as the prime electrical signal, is applied to a precision electronic controller 14 that develops an electrical control signal varying in amplitude as a function of frequency of the prime signal. This control signal is a variable D.C. signal that is supplied to control device 15 to maintain the output speed of prime mover 11 constant. It is the electronic control device 14 that constitutes the principle subject matter of the present invention, as described in detail hereinafter. In the construction illustrated in FIG. 1, a power supply 16 is also coupled to signal generator 13 and utilizes the prime electrical signal from generator 13 to develop suitable operating potentials for the electronic control 14.

Figure 2:
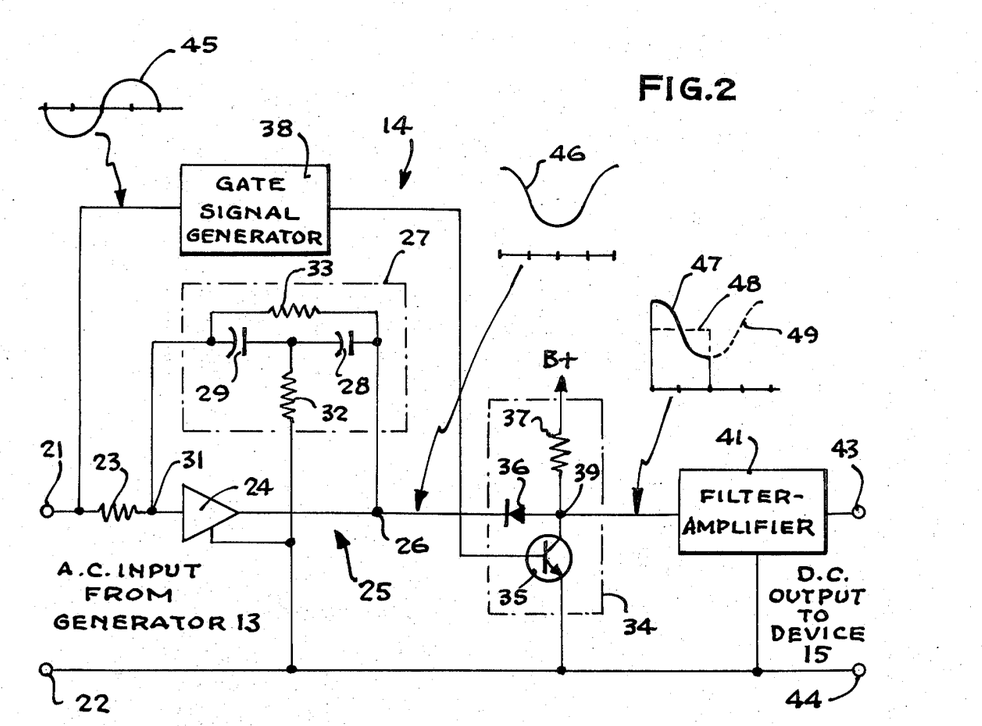
FIG. 2 is a simplified circuit diagram, partly in block form, of a precision electronic constant-speed control constructed in accordance with the invention.

FIG. 2 is a simplified representation of the electronic control circuit 14, and is utilized to explain some of the basic operating principles of the invention. Control 14, as illustrated in FIG. 2, includes two input terminals 21 and 22 to which the prime A.C. signal from generator 13 (FIG. 1) is applied. Terminal 21 is connected to an input resistor 23 that is in turn connected to the input terminal 31 of an operational amplifier 24 incorporated in a phase shift network 25. Amplifier 24 is also connected to the other input terminal 22 and has an output terminal 26 connected to a phase shift feedback circuit 27.

Feedback circuit 27 includes a bridged-T notch filter comprising two capacitors 28 and 29 connected in series from the output terminal 26 of amplifier 24 to its input terminal 31. A resistor 32 is connected from the common terminal of capacitors 28 and 29 to input terminal 22 of the control. Another resistor 33 is connected in parallel with the two capacitors 28 and 29. It will be recognized that the notch filter afforded by feedback circuit 27 has a sharply peaked response at a given operating frequency, affording a similarly peaked operating characteristic, but inverted, for the phase shift network 25. The bridged-T notch filter affords highly desirable operating characteristics, but other filter configurations could be used.

Control circuit 14, as illustrated in FIG. 2, further comprises a synchronous detector 34, including a transistor 35 having its emitter connected to input terminal 22. The collector of transistor 35 is connected to the output terminal 26 of amplifier 24 through a blocking diode 36. The collector of transistor 35 is also connected to a power supply, designated as B+, through a resistor 37. The base of transistor 35 is connected to the output of a gate signal generator 38 having its input connected to the prime signal input terminal 21.

The output of synchronous detector 34 is derived from a terminal 39 at the collector of transistor 35 and is applied to a filter and amplifier circuit 41. The filter and amplifier circuit is connected to output terminals 43 and 44 which are in turn connected to the speed control device 15 (FIG. 11).

In operation, the gate signal generator 38 develops a gating signal of substantially rectangular waveform, at the operating frequency of the prime electrical signal 45. The square wave gating signal is applied to the base of transistor 35, which functions as an electrical switch. Thus, the gating signal actuates the electronic switch comprising transistor 35 on and off in alternate half cycles corresponding to alternate half cycles of the prime signal supplied to input terminals 21 and 22.

Network 25 shifts the phase of the input signal, comprising the prime signal 45, by 90° at an operating frequency determined by the impedances of capacitors 28 and 29 and resistors 32 and 33 in the phase shifting feedback circuit 27. The phase shift is precisely 90° at the desired operating frequency for prime signal 45 and varies monotonically with any change in frequency relative to the selected operating frequency. Detector 34 is a simplified form of synchronous demodulator; thus, network 25 and detector 34 together form a complete frequency discriminator.

In FIG. 2, the waveform of the input to detector 34 is shown by the curve 46 and the waveform of the detector output, before filtering, is indicated by the curve 47. The related gating signal waveform is indicated by the broken line 48 shown in conjunction with the waveform 47 for the detector output. It is seen that the significant output, comprising waveform 47, occurs only during alternate half cycles of the gating signal 48 and hence during alternate half cycles of prime signal 45. During the half cycle when the detector transistor 35 is cut off, waveform 47 corresponds to the A.C. output of the phase shift network 25 during that interval and the average value is the same as that which would exist in the absence of an A.C. signal at the network output. In the alternate half cycle, the detector output is approximately zero, the omitted portion of the input being indicated by the dash line 49.

In the first half cycle, when transistor 35 is cut off, if the frequency and hence the phase of the output 46 from network 25 changes, the A.C. portion corresponding to curve 47 changes to be more nearly in phase with or out of phase with the gating signal 48. As a result, the average value of the output signal from detector 34 increases or decreases with changes in frequency of the prime input signal 45. These variations in average value appear as variations in the amplitude of the D.C. output signal from filter amplifier 41 and afford an effective D.C. control signal that can be applied to the speed control device 15 (FIG. 1) to adjust the speed of the prime mover 11.

Figure 3:
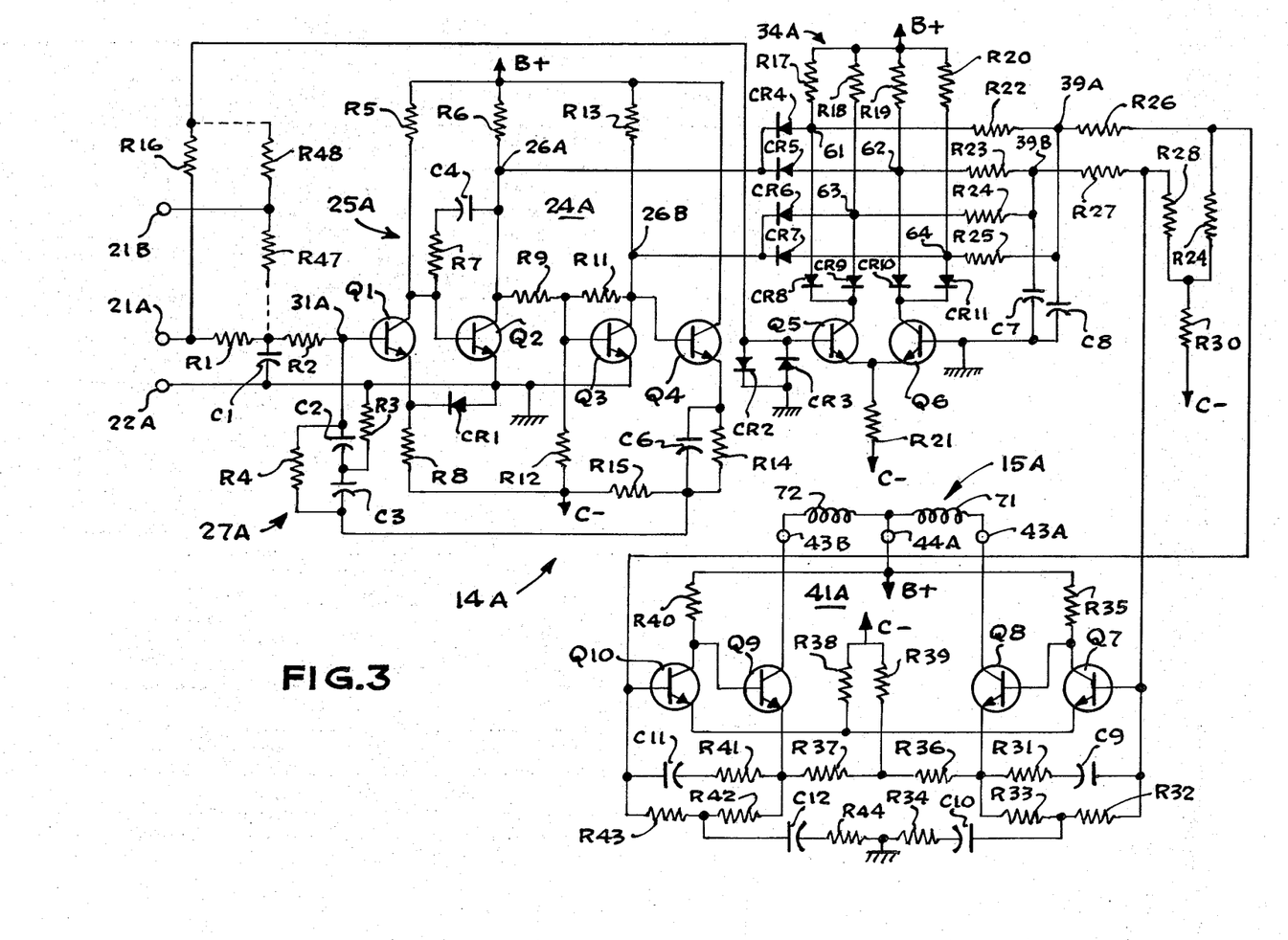
FIG. 3 is a schematic diagram of a precision electronic constant-speed control constructed in accordance with a preferred embodiment of the present invention.

FIG. 3 affords a detailed circuit diagram of an electronic control 14A constructed in accordance with a preferred embodiment of the present invention. In this embodiment, one input terminal 22A is shown as system ground. The other input terminal 21A is connected to a resistor R1 in series with a resistor R2, resistor R2 being connected to the input terminal 31A of a phase shift network 25A. The common terminal of resistors R1 and R2 is connected to a capacitor C1 that is returned to system ground.

Network 25A includes an operational amplifier 24A comprising four transistors Q1, Q2, Q3 and Q4. The base of the first transistion Q1 is connected to input terminal 31A. The emitter of transistor Q1 is connected to a resistor R8 that is returned to a negative D.C. supply designated as C−. The emitter of transistor Q1 is also connected to a diode CR1 that is returned to system ground. The collector of transistor Q1 is connected to a resistor R5 that is in turn connected to a positive power supply voltage designated as B+.

The collector of transistor Q1 is connected to the base of transistor Q2. The emitter of transistor Q2 is grounded and the collector is returned to the B+ supply through a resistor R6. The collector of transistor Q2 is also connected back to its base through the series combination of a capacitor C4 and a resistor R7. The collector of transistor Q2 affords one output terminal 26A for the phase shift network 25A.

The collector of transistor Q2 is connected to a resistor R9 that is in turn connected to the base of the third transistor Q3. The base of transistor Q3 is also returned to the C− supply through a resistor R12. The emitter of transistor Q3 is grounded and the collector is returned to the B+ supply through a resistor R13. A feedback resistor R11 is connected from the collector to the base of transistor Q3. The collector of transistor Q3 affords a second output terminal 26B for the phase shift network 25A.

The collector of transistor Q3 is connected to the base of the fourth transistor Q4 in amplifier 24A, transistor Q4 comprising a part of the feedback phase shift circuit 27A. The collector of transistor Q4 is connected to the B+ supply. The emitter of transistor Q4 is connected to the parallel combination of a resistor R14 and a capacitor C6, the parallel RC circuit being returned to the C− supply through a resistor R15. The RC circuit comprising resistor R14 and capacitor C6 is also connected to a bridged-T filter circuit including the series combination of a capacitor C3 and a capacitor C2, with capacitor C2 being connected back to the amplifier input terminal 31A. A resistor R4 is connected in parallel with the capacitors C2 and C3. A resistor R3 is connected from the common terminal of capacitor C2 and C3 to system ground, input terminal 22A.

Control circuit 14A includes a multi-stage synchronous detector 34A comprising two solid-state electronic switches constituting the transistors Q5 and Q6. The emitters of transistors Q5 and Q6 are connected to each other and are also connected to a resistor R21 that is returned to the C−supply. The collector of transistor Q5 is connected to a diode CR8 that is returned to the B+ supply through a resistor R17 and is also connected to a diode CR9 that is returned to the B+ supply through a resistor R18. Similarly, the collector of transistor Q6 is connected to B+ through the series combination of a diode CR10 and a resistor R19 and through the series combination of a diode CR11 and a resistor R20.

The first output terminal 26A of network 25A is connected through a diode CR4 to a terminal 61 in detector 34A, terminal 61 constituting the common terminal of resistor R17 and diode CR8. Terminal 26A is also connected through a diode CR5 to a terminal 62 in detector 34A at the junction of resistor R19 and diode CR10. The other phase shift output terminal 26B is connected through a diode CR6 to a terminal 63 in detector 34A at the junction of resistor R18 and diode CR9. Terminal 26B is also connected through a diode CR7 to a terminal 64 at the junction of resistor R20 and diode C11.

The detector terminal 61 is connected through a resistor R22 to a first detector output terminal 39A. The internal terminal 64 is similarly connected to output terminal 39A through a resistor R25. The internal terminals 62 and 63 of the detector, on the other hand, are connected to a second detector output terminal 39B, through two resistors R23 and R24 respectively. Output terminal 39A is connected to a capacitor C8 that is returned to ground and terminal 39B is similarly connected to a capacitor C7 that is returned to ground.

The gate signal generator 38A for the circuit shown in FIG. 3 comprises a resistor R16 connected to the input terminal 21A and connected to the base of transistor Q5 in detector 34A. The gate signal generator further includes two oppositely polarized diodes CR2 and CR3 connected from the base of transistor Q5 to system ground. The base of transistor Q6 is grounded.

The filter amplifier 41A in control circuit 14A is a balanced differential amplifier including four transistors Q7, Q8, Q9 and Q10. The input to one side of amplifier 41A comprises a resistor R27 connected in series from detector terminal 39B to the base of transistor Q7. The base of transistor Q7 is also connected to a resistor R28 that is returned to the C− supply through a resistor R30. The collector of transistor Q7 is connected to the B+ supply through a resistor R35. The emitter of transistor Q7 is connected to the emitter of the corresponding transistor Q10 in the other side of the amplifier and both are connected to a resistor R38 that is returned to C−.

The collector of transistor Q7 is connected to the base of transistor Q8. The emitter of transistor Q8 is connected to a resistor R31 which is in series with a capacitor C9, capacitor C9 being returned to the base of transistor Q7. The feedback circuit in this stage of amplifier 41A further comprises two resistors R33 and R32 connected in series from the emitter of transistor Q8 back to the base of transistor Q7. A capacitor C10 and a resistor R34 are connected in series from the common terminal of resistors R32 and R33 to system ground. The emitter of transistor Q8 is also connected to a resistor R36 that is in turn connected to a resistor R37 leading to the emitter of the output transistor Q9 in the other half of amplifier 41A; the common terminal of resistors R36 and R37 is connected to a resistor R39 that is returned to the C− supply.

The input transistor Q10 in the other half of amplifier 41A has its base connected to detector output terminal 39A through a resistor R26. The base of transistor Q10 is also connected to a resistor R29 that is returned to the C− supply through resistor R30. The collector of transistor Q10 is returned to the B+ supply through a resistor R40 and is connected to the base of transistor Q9.

The feedback and filter circuit in the second stage of amplifier 41A includes the series combination of a resistor R41 and a capacitor C11 connected from the emitter of transistor Q9 back to the base of transistor Q10. A parallel feedback circuit is afforded by the series resistors R42 and R43, the common terminal of these resistors being returned to system ground through the series combination of a capacitor C12 and a resistor R44.

The output terminals 43A and 43B of the filter amplifier circuit 41A are connected to the collectors of transistors Q8 and Q9 respectively. In the arrangement illustrated in FIG. 3, the speed control device 15A is shown as a servo valve having two operating ocils 71 and 72. Coils 71 and 72 are connected in series with each other across the output terminals 43A and 43B of the control 14A. A third terminal 44A is shown, connecting the juncture of coils 71 and 72 to the B+ supply.

The specific circuit shown in FIG. 3 was designed for a dual-coil servo valve load, the servo valve 15A, with a differential full scale output of 8 milliamperes D.C. at the output terminals 43A and 43B, utilizing a nominal power supply of 16 volts positive (B+) and 8 volts negative (C−) but operable with a minimum D.C. power input of 19 volts and a maximum of 31 volts. The design level for the prime electrical A.C. signals supplied to terminals 21A and 22A was 11 volts; the operating frequency for the control 15A is intended to be in a range between several hundred hertz and a few thousand hertz with a static accuracy of one percent and with adaptability to a variety of system dynamics. Control 14A is a true frequency discriminator, generating an electrical output at terminals 43A and 43B that approximates a linear function of the frequency of the A.C. input to terminals 21A and 22A. Specifically, control 14A generates a differential D.C. output current that is closely proportional to deviation of the prime signal supplied to terminals 21A and 22A from a fixed reference frequency. The primary intended application was the control of the rotational speed of an output shaft coupled to an electrical generator; either the shaft rotation or the generator voltage may be the useful output of the package.

The fixed reference frequency for control 14A is determined by the natural frequency of the passive resistor-capacitor network comprising resistors R3 and R4 and capacitors C2 and C3, these elements constituting the bridged-T notch network in the feedback path for amplifier 24A. When feedback network 27A is constructed or adjusted to the required precision, variations in other components of the control illustrated in FIG. 3 have at most a secondary effect on frequency stability. The sensitivity of control 14A, in terms of the amplitude of output current as a function of frequency deviation in the input, is well stabilized for a constant input amplitude. However, sensitivity is somewhat proportional to input amplitude.

The static response pattern for the control 14A of FIG. 3 is monotonic and safe because the correct polarity of output results even for wide deviations of the frequency of the input signal from the desired operating frequency. In fact, the correct polarity is realized essentially from zero to ultrasonic frequencies. In addition, the response pattern remains correct in form, although with reduced sensitivity, for input amplitudes well below the nominal value, down to approximately 10 percent. Thus, a control circuit such as that illustrated in FIG. 3 is capable of exerting properly directed control shortly after a power system such as the system 10 of FIG. 1 is started from rest. Obviously, the electronic control 14A cannot drive the servo valve 15A (FIG. 3) until the power is applied and until the supply voltage becomes sufficiently large to energize the semiconductor devices in the control.

The tuned input amplifier 24A has a single-ended input, the input circuit connected to the base of transistor Q1, but affords differential outputs at the terminals 26A and 26B. Negative feedback is provided through the precision notch filter 27A, which provides the tuning characteristic for amplifier 24A. Good frequency stability results from the need for only a few critical components in the principal frequency-selective circuit, feedback circuit 27A; these components, C2, C3, R3 and R4, are available in highly stable forms. The overall response of network 25A, comprising amplifier 24A and its frequency selective feedback 27A, approaches a classic under-damped second-order function. That is, the amplifier affords a low-pass characteristic with a pronounced peak at an operating frequency just below the natural frequency of filter 27A, and with a phase shift of 90° at the natural frequency. The phase shift varies strongly and approximately linearly about this frequency.

The push-pull output of amplifier 24A permits full-wave demodulation in the synchronous detector 34A and contributes the circuit symmetry and balance. The sharply tuned low-pass characteristics of the phase shifting network 25A, which approximates that of a sharply tuned band-pass filter, tends to minimize the effect of any noise or harmonic content in the input signal to the control.

Figure 4:
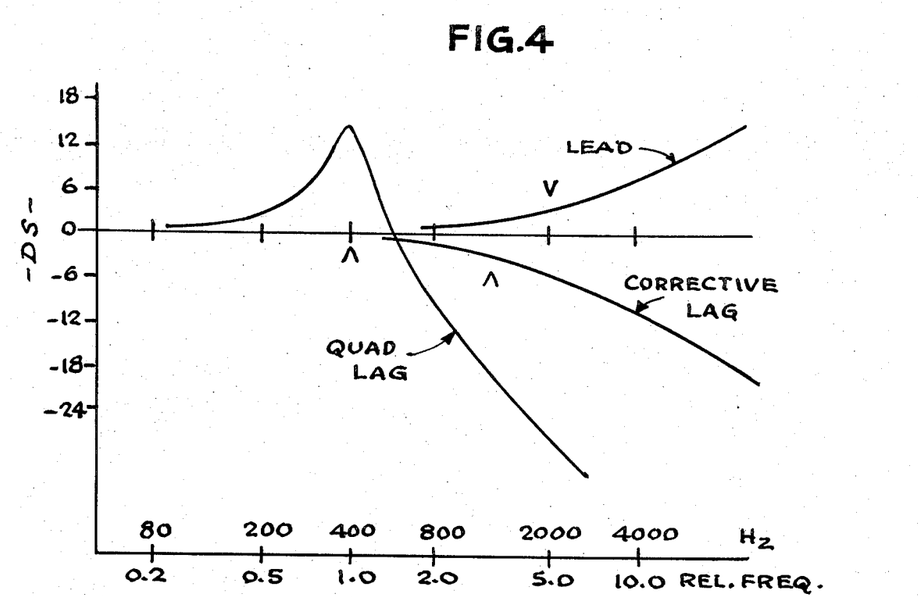
FIG. 4 is a plot of the operating characteristics of a frequency reference circuit utilized in the controls of FIGS. 2 and 3.
Figure 5:
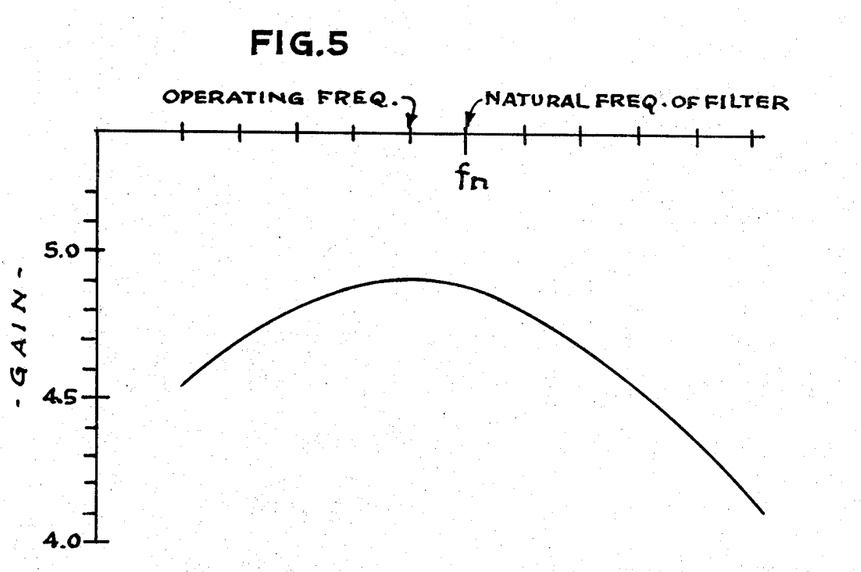
FIG. 5 is a plot of relative gain with resepct to frequency deviation for the operating region of the controls of FIGS. 2 and 3.

Amplifier 24A is arranged operational-amplifier fashion, with the appropriate output chosen to make the feedback negative. The overall response of network 25A is essentially the inverse of the response of feedback circuit 27A. Illustrative gain plots are shown in FIGS. 4 and 5.

The major purpose of feedback circuit 27A, comprised of capacitors C2 and C3, and resistors R3 and R4, is to provide a rapid and stable change in phase with frequency. The capacitors are equal and the resistors are in a fixed ratio; for the illustrated circuit, the ratio is R4/R3 = 100. Circuit 27A is a bridged-T notch filter operated in the voltage-in/current-out mode; that is, the output is connected to a virtual short-circuit at the error point of the operational amplifier 24A. The form of the response of amplifier 24A (see FIG. 4) under these conditions is third-order: a highly under-damped quadratic lag together with a simple lead. The break frequency of the lead is five times the natural frequency of the quadratic lag. The damping factor of the quadratic is 0.1; as a result the transmission at the top of the notch is approximately five times the low-frequency transmission. The phase slope, or ratio of phase angle to frequency, is approximately 10. That is, the phase changes 0.1 radian per percent frequency change.

In any second-order system with a pronounced peak or notch, there is a natural frequency that is very near but not identical to the peak or notch frequency (although the two merge as damping becomes vanishingly small). This difference sould be taken into account.

In terms of the components of filter 27A,
(1)    $C = C2 = C3$, and
(2)    $R' = \sqrt{R3R4}$, so that
the natural frequence $f_n$ of the filter is
(3)    $f_n = 1/2\pi R'C$ At the natural frequency, the phase lag by definition is 90° and the relative amplification (with respect to the low-frequency value) is, as noted above, approximately five. The peak in the amplifier response exists at a slightly lower frequency, as shown in FIG. 5, where the phase lag is slightly smaller and the amplification slightly larger.

The basic response of amplifier 24A is altered by the lead term (FIG. A). This causes a further slight phase lag at the peak frequency. Actually the frequency at which the composite peak occurs shifts slightly, because of this term, but the effect is negligible. Also the phase slope contributed by this factor is very small.

For reasons of response symmetry about the operating frequency and enhanced stability, operation at the peak frequency (instead of on the slope of the peak curve) is preferable. The circuit operates at the frequency at which the phase is 90°. The phase can be corrected readily by a small corrective input lag (FIG. 4), realized by incorporating capacitor C1 in the input circuit (FIG. 3). The time constant of this corrective factor is selected to contribute an additional limited phase lag at the peak frequency. Here again, only a negligible shift occurs in the frequency at which the response peaks. However, the relative amplification is decreased a little; the additional phase slope from this term again is quite small.

The phase at the peak frequency now is 90° and hence the circuit operates here; the operating frequency $f_o$ is approximately $0.99 f_n$ and the overall relative amplification is 4.9 (FIG. 5). The slope is in the sense of increasing lag with increasing frequency, and in simple terms is 5.8° for 1 percent frequency shift.

The gain drop-off and phase shift associated with frequency deviation has an effect on system dynamics. The effect is approximately that of a simple lag acting on the modulation frequency (not the input or carrier frequency) with a break frequency equal to the half-bandwidth. This half-bandwidth is equal to the damping factor times the input frequency, or 40 Hz here.

The most common alteration requirement for the control is in operating frequency. Major network component values for any frequency are found from equations (1) – (3) and the relation of $f_o$ to $f_n$, together with the relations between R3 and R4 and C2 and C3. For practical reasons, it is better by far to select common capacitance values; it is easier to get a variety of precision resistance values. Yet the impedance value of the circuit 27A should remain substantially unchanted. Hence, to change the operating frequency it is best to select a reasonable capacitor value that roughly satisfies equation (3) with the existing resistance values (in the vicinity of 400 and 40,000 ohms), and then calculate the specific required resistance values. The precision required for these four components is determined primarily by the static frequency-accuracy requirements. However, a secondary effect is that a departure from the design ratios affects the circuit gain or sensitivity. As a final step, resistors R1 and R2 and capacitor C1 are selected for adequate phase correction. A precision of 5 percent for these three components is adequate in most applications.

Alteration of the various ratios changes the sensitivity and signal levels, and is not recommended. Modification of the overall sensitivity is accomplished more satisfactorily in the output driver. Substantial changes in sensitivity may require extensive redesign.

The two transistors Q5 and Q6 constitute the electronic switches for synchronous demodulator 34A; they are also a part of the gating signal generator 38A. The two transistors, together with the other components of the gating signal generator and the diode clusters comprising diodes CR4-CR11, afford a fully synchronous phase-sensitive detector. The phase-sensitive feature is the primary characteirstic, as regards the overall operation of control 14A, and causes the combination of network 25A and detector 34A to act as a frequency discriminator.

Detector 34A receives a differential A.C. input from the output terminals 26A and 26B of amplifier 24A; these A.C. signals each include a D.C. component. The detector generates a differential D.C. output, at terminals 39A and 39B, accompanied by a large and approximately constant double-frequency ripple component. This differential D.C. output is zero at the selected output frequency and varies approximately with phase and hence with frequency deviation. The output polarities at terminals 39A and 39B, for frequency variations above and below the selected operating frequency, are opposite to each other. The output from detector 34A is developed in four component signals, appearing at internal terminals 61, 62, 63 and 64, that are combined in the following resistor network comprising resistors R22 through R25. It should be noted that the output at terminals 39A and 39B is a D.C. current only in static situations and becomes a varying A.C. signal when dynamics are considered.

Figure 6:
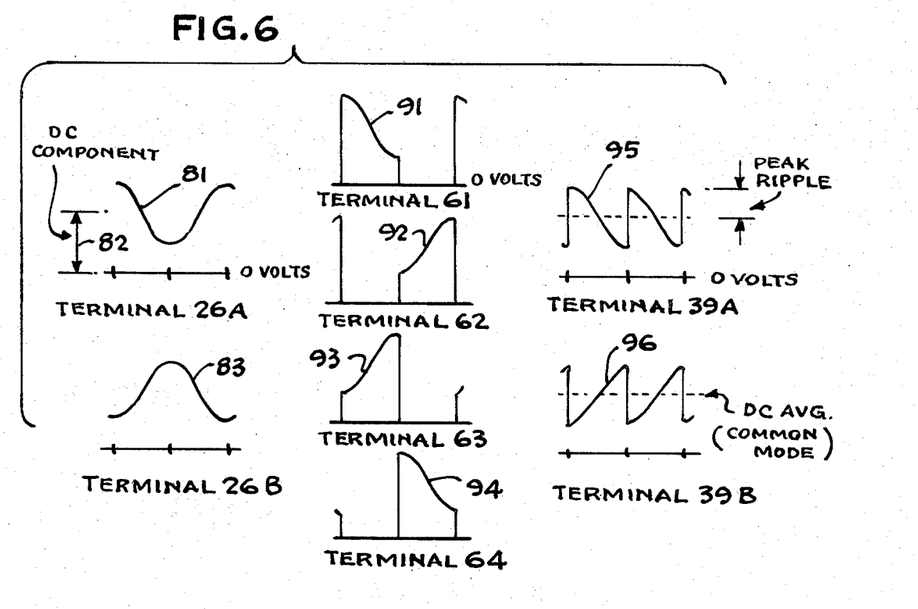
FIG. 6 comprises a series of waveforms illustrating the operation of the synchronous detector in the control of FIG. 3 at the preselected operating frequency.
Figure 7:
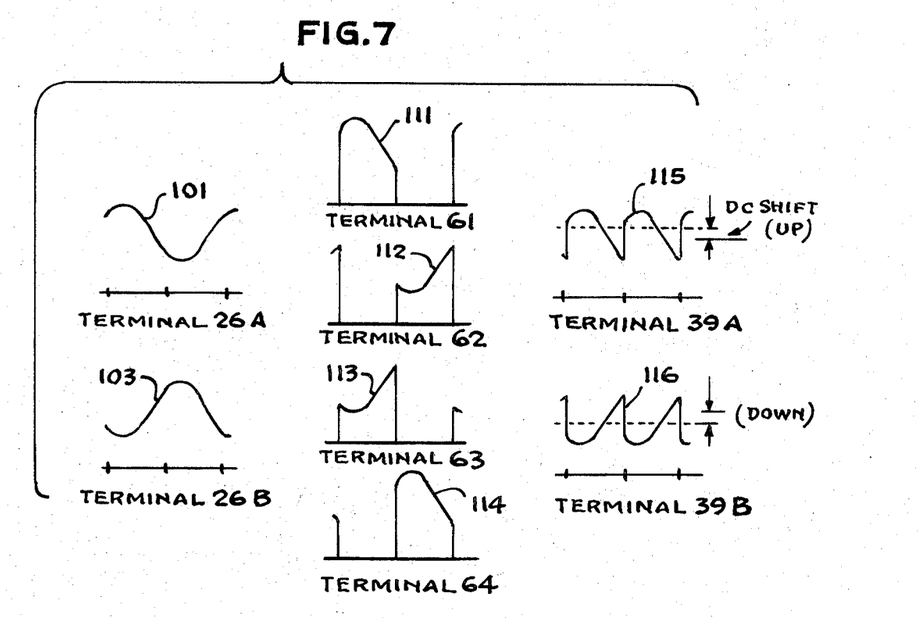
FIG. 7 shows a series of waveforms, similar to FIG. 6, for a given frequency deviation.

FIGS. 6 and 7 afford a more complete and explicit illustration of the operation of detector 34A for two different frequency conditions. The waveforms illustrated in FIG. 6 apply to a condition in which the input to control 14A corresponds precisely to the design frequency. Under these circumstances, the input signal to diodes CR4 and CR5 corresponds to the waveform 81, a sine wave having a D.C. component 82, and is 180° out of phase with respect to the similar input signal 83 supplied to diodes CR6 and CR7. As a result of the gating of transistors Q5 and Q6, the signal appearing at terminal 61 is of the form represented by curve 91 in FIG. 6, whereas the voltage developed at terminal 62 conforms to curve 92. Waveforms 93 and 94 in FIG. 6 illustrate the operating conditions at terminals 63 and 64 respectively.

In FIG. 6, the output appearing at terminals 39A is represented by curve 95 and will be seen to constitute the combination of signals 91 and 94 from terminals 61 and 64. The waveform for the output signal at terminal 39B is represented by curve 96 and represents the addition of the signals 92 and 93 appearing at internal terminals 62 and 63. Each of the two output signals 95 and 96 has a D.C. level and the D.C. level for the two output signals is equal.

FIG. 7 presents the same waveforms as FIG. 6, except that the input deviates from the operating frequency of control 14A, the assumed error being approximately eight percent. For these conditions, the input signal to diodes CR4 and CR5 comprises the waveform 101 and is again 180° out of phase relative to the input signal 103 to diodes CR6 and CR7. The signal at terminal 61 is represented by curve 111, the voltage developed at terminal 62 conforms to waveform 112, the signal at terminal 93 is waveform 113 and the voltage at terminal 64 is waveform 114. The output for terminal 39A is shown by the waveform 115, constituting the combination of signals 111 and 114 from terminals 61 and 64. The waveform for the output signal at terminal 39B is indicated by curve 116 and constitutes the sum of the signals 112 and 113 at internal terminals 62 and 63.

The ripple component in the output from detector 34A, as shown in FIGS. 6 and 7, is rather unusual in that it is approximately constant rather than varying with the amplitude of the useful output. Thus, there is an appreciable ripple content at the operating condition corresponding to the desired operating frequency (FIG. 6), and the ripple changes but little with a substantial frequency deviation (FIG. 7). The major component of the ripple occurs at double the operating frequency; in a given specific control, utilizing the impedance values set forth hereinafter, the peak value is approximately 2 volts. The ripple in the differential input to filter amplifier 41A is additive and hence is twice that value.

Substantial filtering is necessary to reduce this ripple to negligible proportions. Disregarding any boosting in filter amplifier 41A for dynamic-response tailoring, the ripple amplitude is equal to the useful signal developed by the detector for a frequency deviation of fourteen percent. The filtering forms one of three important characteristics of circuit 41A; the other are the D.C. gain, determined by the requirements of control device 15A, and lead compensation.

For reliable operation and to extend the life of control device 15A, the ripple in the output to the control device should be limited. For example, for a typical servo valve the peak value of the ripple should not exceed five percent of the full D.C. drive current. To preserve speed of response, filtering should be accomplished in a manner that miminizes phase lag and amplitude roll-off in the operating frequency range, which extends to the vicinity of 10 to 20 Hz.

In the illustrated circuit, two stages of filtering are employed. The first stage is formed by capacitor C7 for one side of amplifier 41 (capacitor C8 for the other), taken together with the equivalent resistance for resistors R23, R24, and R27 all in parallel. The second stage of filtering for the same side of amplifier 41A results from the feedback capacitor C9. The small resistor R31 in series with capacitor C9 is a parasitic suppressor and may be ignored with respect to the basic filtering effect. The two stages of filtering afford an adequate reduction in the ripple.

In considering lead compensation in circuit 41A, it should be noted that a phase lead requires a gain boost. A rising gain characteristic (and hence the lead) must not be allowed to extend higher in frequency than absolutely necessary, because this boost increases the gain at the ripple frequency.

In the illustrated circuit that restriction is circumvented, but at a price. Here the feedback path, resistors R32 and R33 on one side, is shunted to ground at the junction of the resistors by the lead capacitor C10. Thus the feedback is progressively reduced at higher frequencies; the gain rises, and the phase is leading. The break frequency is determined by capacitor C10 and an equivalent resistance, for lead purposes, of resistors R32 and R33 in parallel. In a typical circuit, the lead break frequency may be approximately 3 Hz. The ripple is not directly affected by this boost, because the gain at the ripple frequency is determined by capacitor C9 and not the feedback path through resistors R32 and R33. However, th configuration developed here of capacitors C9 and C10 and resistors R32 and R33 has become a bridged-T notch network, with all the unique characteristics of that circuit. In particular, the feedback has a notch, and the gain an unwelcome peak. The amplitude of this peak, if not otherwise limited, would be a factor equal to the square root of the capacitor ratio, or about twenty.

This peak is reduced by the spoiler resistor R34. The net result is a complex response including a lead term and an underdamped quadratic lag with a damping factor somewhat less than unity. The damping factor is determined, among other things, by resistor R34 and the necessarily rather small loop gain of the operational-amplifier configuration Q7–Q8 at the natural frequency. Rigorous analytic manipulation of the total response here is cumbersome, to say the least; some experimentation to establish final impedance values is necessary.

Control 14A of FIG. 3 can be readily modified to accept a two-phase (120°) input instead of a single-ended input signal. To effect this modification, a resistor R47 is connected from the junction of resistors R1 and R2 to an additional input terminal 21B and a resistor R48 is connected from terminal 21B to the base of transistor Q5, with resistor R2 being reduced to one half the usual value.

Power consumption of the complete control 14A as illustrated in FIG. 3, using the components set forth hereinafter, is approximately 0.75 watt. Consequently, the input signal from signal generator 13 may itself afford a convenient source of this small power demand, even if the signal generator is a relatively simple magnetic pickup or similar transducer.

The following tabulations of circuit parameters for control 14A, FIG. 3, are set forth solely in order to afford more concrete illustrations of given examples of the invention, and are not intended as a limitation on the invention. The given values, in each instance, afford a control having an operating frequency of 400 Hz.

RESISTORS

|  | Unbalanced Power Supply | Balanced Power Supply |
|---|---|---|
| R1 | 390 kilohms | 300 kilohms |
| R2 | 360 kilohms | 300 kilohms |
| R3 | 394 ohms |  |
| R4 | 39.4 kilohms |  |
| R5 | 100 kilohms |  |
| R6 | 4.7 kilohms | 5.6 kilohms |
| R7 | 680 ohms |  |
| R8 |  | 18 kilohms |
| R9 | 20.0 kilohms | 43.2 kilohms |
| R11 | 22.1 kilohms | 47.5 kilohms |
| R12 | 15.4 kilohms | 60.4 kilohms |
| R13 | 6.2 kilohms | 8.2 kilohms |
| R14 | 2.7 kilohms | 3.9 kilohms |
| R15 | 3.6 kilohms | 10 kilohms |
| R16 | 6.8 kilohms |  |
| R17, R18, R19, R20 | 7.5 kilohms | 12 kilohms |
| R21 | 1.5 kilohms | 5.1 kilohms |
| R22, R23, R24, R25 | 40.2 kilohms | 47.5 kilohms |
| R26, R27, | 10 kilohms | 10 kilohms |
| R28, R29 | 10 kilohms | 8.2 kilohms |
| R30 | 5.6 kilohms | 20 kilohms |
| R31, R41 | 1 kilohm |  |
| R32, R33, R42, R43 | 20 kilohms |  |
| R34, R44 | 510 kilohms |  |
| R35, R40 | 27 kilohms |  |
| R36, R37 | 180 kilohms | 220 kilohms |
| R38 | 4.3 kilohms | 13 kilohms |
| R39 | 360 kilohms | 1.0 kilohm |

RESISTORS FOR TWO-PHASE MODIFICATION

| | | |
|---|---|---|
| R2 | 180 kilohms | 150 kilohms |
| R47 | 390 kilohms | 300 kilohms |
| R48 | 6.8 kilohms | |

CAPACITORS

| | |
|---|---|
| C1 | 1500 picofarads |
| C2, C3 | 0.1 microfarad |
| C4 | 150 picofarads |
| C6 | 10 microfarads |
| C7, C8 | 0.68 microfarads |
| C9, C11 | 0.012 microfarads |
| C10, C12 | 4.7 microfarads |

SEMICONDUCTOR DEVICES

| | |
|---|---|
| All transistors | 2N2222A |
| All diodes | 1N4446 |

POWER SUPPLY

| | | |
|---|---|---|
| B+ | +16 volts D.C. | +15 volts D.C. |
| C− | −8 volts D.C. | −15 volts D.C. |

CONTROL DEVICE 15A

Dual-coil servo valve, 1000 ohms/coil

For the components of filter 27A, tolerances of one percent are preferred. It wil be recognized that the configuration of the bridged-T filter can be changed, particularly by reversing the relationship of the resistors and the capacitors, as in the case of the filters in circuit 41A.

As discussed in conjunction with FIG. 1, it is desirable to afford a power supply 16 with power derived from the prime signal that also actuates the electronic control 14. A major advantage of this self-powered arrangement is simplicity. There are only two sets of connections to the complete control, comprising units 14 and 16, these being the prime signal input and the control signal output. The control system is free from any ties to other electronic apparatus. On the other hand, if no other electronics exist in the overall power system, as in an all-hydraulic package, no source of electrical power other than the prime signal need be furnished.

A useful byproduct of the self-powered arrangement of FIG. 1 is inherent compatibility between signal voltage and power supply voltage if the prime signal changes in amplitude. In precision applications where the prime signal is derived from a regulated generator, the power supply voltage from unit 16 to control 14 is held constant. This is not essential to operation of control 14 but does eliminate small secondary sources of error and thus enhances overall performance accuracy.

In any application, the power system must be brought to speed from rest or may suffer severe transients from other causes. In such situations, the tie between signal and power voltages tends to prevent the control from being forced into undesirable modes of operation that might cause a lock-up from which recovery could not be made. The described system exerts effective control from an input voltage of roughly ten percent of normal rated value and thus achieves control shortly after start-up. Although operational parameters such as gain and maximum output are low under these conditions, a useful output does exist with a safe amplitude and appropriate polarity to yield the correct sense of drive.

The electronic control of the invention does not require a smooth sine wave as the prime signal. Network 25A (or 25) has the properties of a low-pass filter, emphasizing the fundamental frequency and hence reducing harmonics. Moreover, synchronous detector 34A responds primarily only to the fundamental frequency and tends to discriminate against the "even" form of distortion that occurs most frequently in other signal sources such as a coil-and-magnet pulse pickup. The only disadvantage of a distorted prime signal is a certain loss of precision because of secondary error sources, in that a change in waveform of the prime signal may result in a small zero shift.

Control unit 14A (FIG. 3) can readily be made an adjustable-speed control simply by using a two-gang variable resistor set for resistors R3 and R4. This forms a simple and effective means for adjusting the operating frequency over a limited range of about 2:1. If a wider control range is required, some modification may be required to accommodate the changing impedance of feedback circuit 27A, or arrangments may be made for coordinated adjustment of capacitors C2 and C3.

I claim:

1. A precision constant-speed control for a power system of the kind including a variable-speed prime mover driving an output shaft and a speed control device, coupled to and controlling the speed of the prime mover, responsive to an applied D.C. control signal, said constant speed control comprising:
   a prime signal generator, driven by the prime mover output shaft, for developing a prime electrical signal having a frequency representative of the shaft speed;
   a synchronous detector including a solid-state electronic switch having a first input, a second input, and an output;
   gate signal generator means, coupled to the prime signal generator, for generating a gating signal of substantially rectangular waveform at the frequency of the prime signal;
   a coupling network, connected to the prime signal generator, including a phase shift circuit for shifting the phase of the prime signal by an odd multiple of 90° at a given operating frequency, the amount of phase shift varying approximately monotonically with frequency;
   means for applying the gating signal and the phase-shifted prime signal to the inputs of the electronic switch, the gating signal actuating said electronic switch between full conductivity and cutoff in alternate half-cycles of the gating signal; and filter means, coupled to the output of the electronic switch, for developing a D.C. control signal varying in amplitude as a function of frequency of the main input to the electronic switch and for applying that control signal to the speed control device to maintain the speed of the prime mover constant.

2. A precision constant-speed control, according to claim 1, in which the phase shift circuit of the coupling network comprises an amplifier having a negative feedback circuit including a notch filter, the network exhibiting a relatively sharp peak in its frequency response characteristic at a frequency approximately corresponding to but slightly different from the natural frequency of the notch filter.

3. A precision constant-speed control, according to claim 2, in which the notch filter is a bridged-T filter having a natural frequency $f_n$, and in which the relationship of the natural frequency to the desired operating frequency fo for the control is $f_o = 0.99\ f_n$.

4. A precision constant-speed control, according to claim 3, in which the amplifier includes a lag-corrective RC filter in its input.

5. A precision constant-speed control, according to claim 1, in which the coupling network comprises a tuned amplifier having a single-ended input and a differential output, in which the synchronous detector includes two stages, each affording full wave gated rectification of one of the differential outputs of the amplifier, and in which the control signal is a differential D.C. signal.

6. A precision constant-speed control, according to claim 5, in which the synchronous detector comprises two gate transistors, actuated to conduction and to cutoff, by the gating signal, in alternating half-cycles of the prime signal and with 180° phase displacement relative to each other, and in which each detector stage comprises a diode-resistance matrix connected to both gate transistors.

7. A precision constant-speed control, according to claim 5, in which the filter means comprises a D.C. differential amplifier, the two halves of the differential amplifier each including a bridged-T filter in a negative feedback circuit.

* * * * *